United States Patent [19]
Stirbl et al.

[11] Patent Number: 5,755,217
[45] Date of Patent: May 26, 1998

[54] SOLAR RADIATION CONCENTRATOR AND RELATED METHOD

[76] Inventors: Robert C. Stirbl, 247 Wadsworth Ave., New York, N.Y. 10033; Peter J. Wilk, 185 W. End Ave. Unit 22M, New York, N.Y. 10023

[21] Appl. No.: 708,569

[22] Filed: Sep. 5, 1996

[51] Int. Cl.$^6$ .................................... F24J 2/08; F24J 2/10
[52] U.S. Cl. .................... 126/714; 126/684; 359/291; 359/846
[58] Field of Search .................... 126/687, 561, 126/714, 696, 697, 684, 683; 359/291, 292, 846

[56] References Cited

U.S. PATENT DOCUMENTS

| | | | |
|---|---|---|---|
| 1,714,443 | 5/1929 | Pineschi et al. | 359/291 |
| 3,397,313 | 8/1968 | Mast | 359/292 |
| 3,612,665 | 10/1971 | Vassiliou | 359/291 |
| 4,174,881 | 11/1979 | Credelle | 359/291 |
| 4,392,711 | 7/1983 | Moraw et al. | 359/292 |
| 4,784,448 | 11/1988 | Sepp et al. | 359/291 |
| 5,447,147 | 9/1995 | Stirbl et al. | 126/561 |

FOREIGN PATENT DOCUMENTS 3019055  3/1982  Germany .................... 126/697

OTHER PUBLICATIONS

Cosentino et al., RCA, "Array of Light Valves Utilizing Liquid Surface Deformations Controlled by Vibrating Elements", 7 May 1971, TN No. 884, pp. 1–3.

"High–Speed Deformable Mirror system", Applied optics, R.H Freeman and H.R. Garcia, vol. 21, No. 4, 15 Feb. 1982, pp. 589–595.

*Primary Examiner*—James C. Yeung
*Attorney, Agent, or Firm*—R. Neil Sudol; Henry D. Coleman

[57] ABSTRACT

A method for concentrating solar energy utilizes a pool of a homogenous fluidic substance disposed over a reflective surface. Mechanical energy is controllably imparted to the pool, for example, via synchronized electromechanical transducers, to generate a standing wave of the fluidic substance in the pool. Incoming solar radiation is differentially reflected from the pool and the reflective surface, upon generation of the standing wave in the fluidic substance, to concentrate the incoming solar radiation at a predetermined location spaced from the pool. At that predetermined location is a solar energy collector for absorbing and storing the solar radiation.

7 Claims, 2 Drawing Sheets

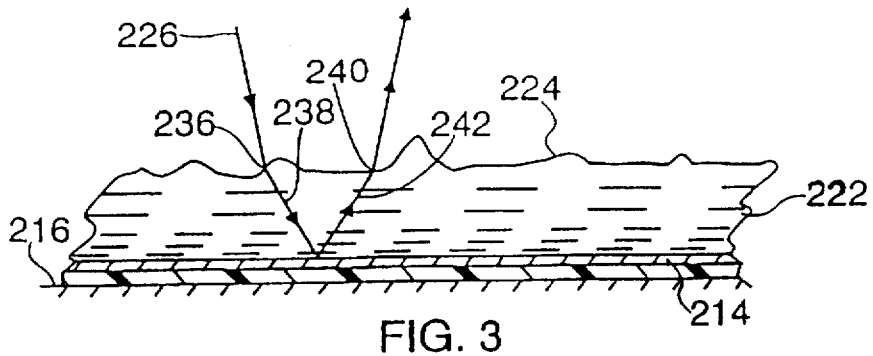
FIG. 3
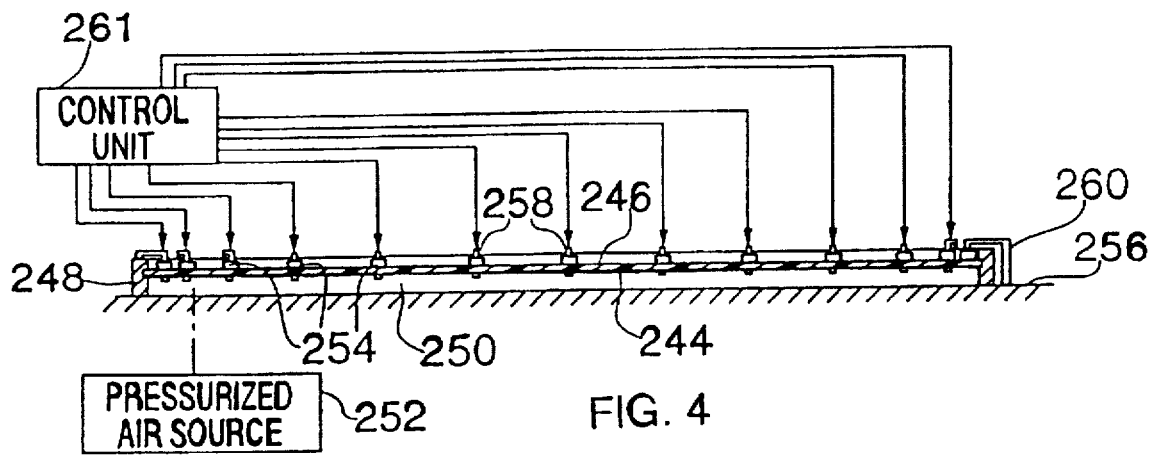
FIG. 4
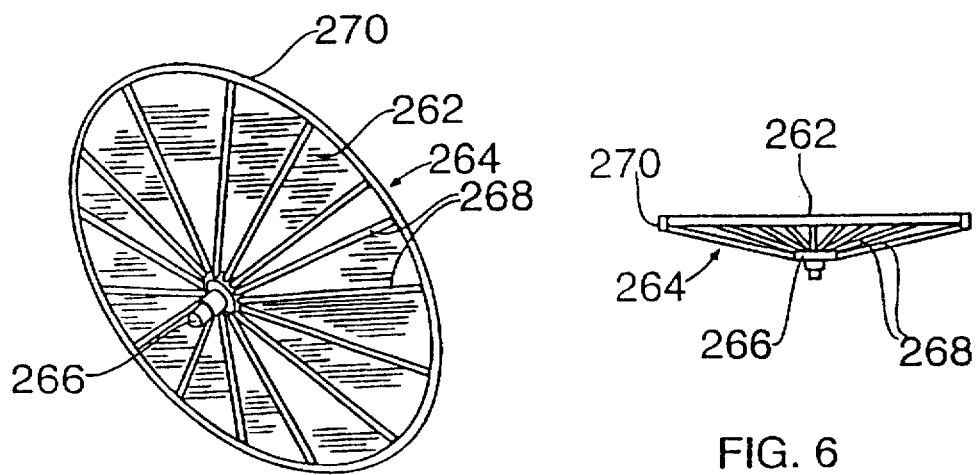
FIG. 5
FIG. 6

SOLAR RADIATION CONCENTRATOR AND RELATED METHOD

BACKGROUND OF THE INVENTION

This invention relates to a method and an associated apparatus for concentrating solar radiation. More particularly, this invention relates to a reflector of electromagnetic radiation and a method for forming the reflector.

It is well known that, with the exception of nuclear power, all of the energy on the earth originates with the sun. Extensive efforts in recent decades have been directed to harnessing solar radiation. Such efforts have resulted in huge mirrors erected on the earth's surface for concentrating incoming solar radiation on energy collectors. A problem with such mirrors is that they are expensive to construct.

OBJECTS OF THE INVENTION

An object of the present invention is to provide a method and/or an apparatus for concentrating solar radiation.

Another object of the present invention is to provide such a method and/or such an apparatus which is relatively inexpensive.

Another, more particular, object of the present invention is to provide such a method and/or apparatus which is readily adaptable to mirrors of differents sizes.

These and other objects of the present invention will be apparent from the drawings and detailed descriptions herein.

SUMMARY OF THE INVENTION

A device for concentrating solar energy comprises, in accordance with an embodiment of the present invention, a reflective film, support elements in contact with the film for supporting the film in a substantially planar configuration, and a mechanical wave generator assembly connected to the film for generating a standing wave in the film of a predetermined characteristic shape able to concentrate incoming solar radiation at a predetermined location spaced from the film.

In accordance with a further feature of the present invention, the wave generator assembly includes a plurality of electromechanical transducers in operative contact with the film, the transducers being spaced from one another along the film. A control unit is operatively connected to the transducers for periodically energizing the transducers to generate the standing wave in the film.

A related method for concentrating solar energy comprises, in accordance with the present invention, the steps of providing a reflective film, supporting the film in a substantially planar configuration, and generating a standing wave in the film of a predetermined characteristic shape able to concentrate incoming solar radiation at a predetermined location spaced from the film.

BRIEF DESCRIPTION OF THE DRAWING

FIG. 3 is a schematic vertical cross-sectional view, on a substantially enlarged scale, of a of a portion of the solar energy concentrator of FIGS. 1 and 2, showing a wave perturbation in a surface of the concentrator.

FIG. 4 is partially a schematic vertical cross-sectional view and partially a block diagram of a device or system for concentrating solar energy, in accordance with the present invention.

FIG. 5 is a partial schematic perspective view of another device or system for concentrating solar energy, in accordance with the present invention.

FIG. 6 is a diagrammatic side elevational view of the solar energy concentrator of FIG. 5.

DETAILED DESCRIPTION

Figure 1:
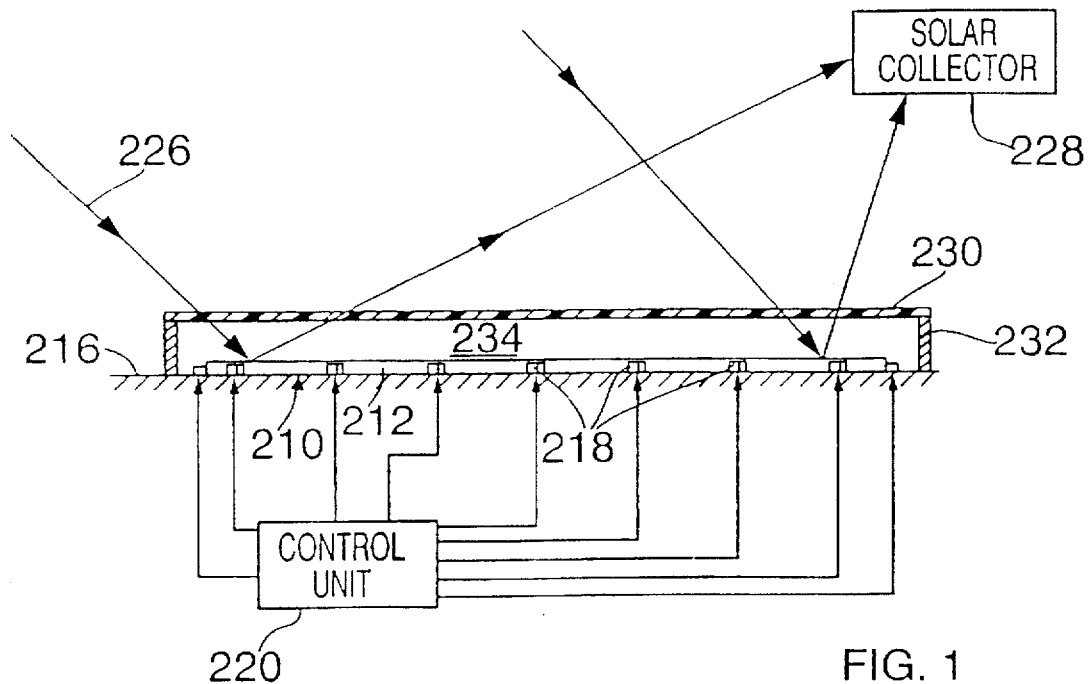
FIG. 1 is partially a schematic vertical cross-sectional view and partially a block diagram of a device or system for concentrating and collecting solar energy.
Figure 2:
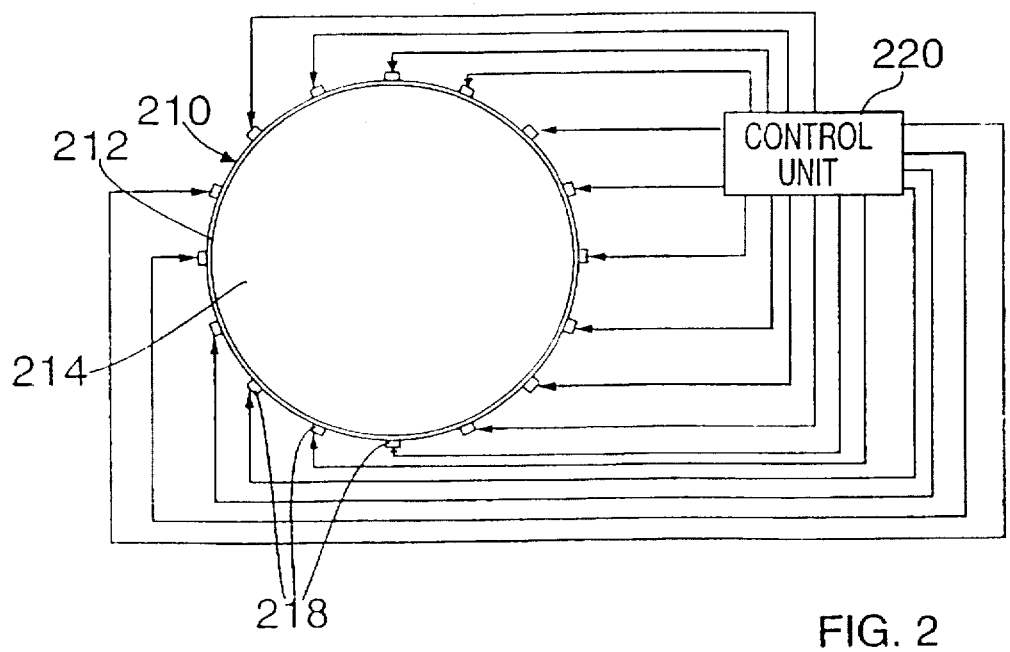
FIG. 2 is partially a schematic top view of a solar energy concentrator shown in FIG. 1 and partially a block diagram.

As illustrated in FIGS. 1 and 2, a device or apparatus for concentrating solar energy comprises a container 10 in the form of an upstanding circular side wall 12 and a reflective bottom wall or horizontal surface 14 contiguous therewith for defining a shallow pool. Bottom wall or horizontal surface 14 is disposed on a ground surface 16. However, the pool 10 could alternatively be placed on a tower (not shown) which in turn is support on the ground.

A plurality of equispaced mechanical wave generators 18 in the form of piezoelectric transducers are connected to pool side wall 12 along an outer surface thereof. A control unit 20 such as a microprocessor is connected to transducers 18 for periodically and synchronously energizing the transducers to generate a symmetric compressive force on side wall 12. To that end, transducers 18 are also connected to ground surface 16.

As depicted in FIG. 3, pool 10 holds a homogenous fluidic substance 22 such as glycol, oil or a gel having a relatively high index of refraction. Control unit 20 energizes transducers 18 to generate a standing wave 24 in the fluidic substance, and more particularly, in the upper surface of the fluidic substance. Standing wave 24 has a predetermined shape characterized by a Bessel function, a Hankel function, a modified Bessel function or a modified Hankel function. Accordingly, pool 10, and more specifically, standing wave 24 and reflective surface 14, are able to concentrate incoming solar radiation 26 (FIG. 1) onto a solar collector 28 at a predetermined location spaced from pool 10.

In the event that the concentration and collection of solar energy is to take place over an extended period, collector 28 may be either constrained to move in tandem with the sun or may have an elongated solar collecting element (not shown) which is disposed or disposable along the path of the concentrated energy beam from pool 10. For example, collector 28 may take the form of a curved metal tube carrying a circulating working fluid such as steam. A drive (not shown) may be connected to the metal collector tube for shifting the tube to track a concentrated solar beam from pool 10, the beam moving in response to or in tandem with the sun.

As further illustrated in FIG. 1, a transparent sheet 30 is disposed above pool 10 for isolating fluidic substance 22 from wind and weather effects. Together with an auxiliary side wall 32, sheet 20 defines a buffer chamber 34 over pool 10. Several such chambers (not shown) may be formed by several vertically spaced transparent sheets to enhance the buffering action.

As further depicted in FIG. 3, a differential reflection of incoming solar radiation 26 is accomplished by refracting at 36 the solar radiation upon passage thereof from ambient air into the fluidic substance 22 in pool 10, transmitting the refracted radiation 38 through fluidic substance 22 to reflective surface 14, reflecting refracted solar radiation 38 from reflective surface 14 and out through the fluidic substance, and again refracting at 40 the reflected solar radiation 42 upon passage thereof from pool 10 into the ambient air.

As shown in FIG. 4, another solar concentrator comprises a circular film 44 having a reflective surface 46. Film 44 is supported in a substantially planar configuration by an upstanding wall 48, to which the film is attached. Film 44 and wall 48 define a chamber 50 which is supplied with pressurized air from a source or pump 52. The pressurized air also serves to support film 44 so that the film maintains a substantially planar horizontal configuration.

A plurality of equispaced mechanical wave generators 54 in the form of piezoelectric transducers are mounted to wall 48 or directly to a ground surface 56 via respective brackets 58 or 60. Transducers 54 are connected to film 44 about the periphery thereof for imparting a transverse vibration to the film. A control unit 61 is operatively connected to transducers 54 for periodically and synchronously energizing the transducers to generate, in film 44, a transverse standing wave characterized by a Bessel function, a Hankel function, a modified Bessel function or a modified Hankel function. Accordingly, film 44 is able to concentrate incoming solar radiation onto a solar collector (not shown) at a predetermined location spaced from film 44. As with the embodiment of the invention illustrated in FIG. 1, a transparent sheet or series of transparent sheets may be positioned over film 44 to isolate or buffer the film from atmospheric perturbations.

A solar energy concentrator in accordance with the present invention may also be placed in space, in orbit around the earth. As illustrated in FIGS. 5 and 6, a reflective film 62 is supported in a substantially planar configuration by a frame 64 having, for instance, a hub 66, a plurality of essentially radial spokes 68 and a circular rim or wheel 70. The perpiphery of film 62 is vibrated by a plurality of angularly equispaced electromechanical transducers (not shown). The energy concentrated by the device of FIGS. 5 and 6 may be focused on a solar energy collector in space or on the surface of the earth.

Although the invention has been described in terms of particular embodiments and applications, one of ordinary skill in the art, in light of this teaching, can generate additional embodiments and modifications without departing from the spirit of or exceeding the scope of the claimed invention. For example, electromechanical transducers in the embodiments of FIGS. 4–6 may be connected to the films 44 and 62 via rings which extend around the films at the peripheries thereof.

It is to be noted, in addition, that the principles of the invention may be applied to solid, relatively rigid concentrators, as well as to pools of liquid or fluidic material and to films. In the case of a solid concentrator transparent sheet, synchronously energized transducers placed around the periphery of the sheet generate compressive standing waves in the material. Under the action of such compressive standing waves, which may be Bessel type or Hankel type functions, the index of refraction of the concentrator sheet is differentially modified according to the Bessel function or Hankel function. This index modification results in the concentration of incoming solar energy at a predetermined location, upon refraction through the sheet and reflection off of an underlying reflective layer.

It is to be noted further that a pool of fluidic material in accordance with the present invention may reflect incoming sunlight from an upper surface of the fluidic substance, that upper surface being characterized by a predetermined mathematical function. Thus, in some cases, reflection from an underlying reflective surface is not necessary to accomplish the objects of the invention. To enhance the reflective capability of the fluidic substance, a layer of an additional material of enhanced reflectivity may be permitted to float on the fluidic substancein the pool.

Accordingly, it is to be understood that the drawings and descriptions herein are proffered by way of example to facilitate comprehension of the invention and should not be construed to limit the scope thereof.

What is claimed is:

1. A device for concentrating solar energy, comprising:

a reflective film;

means for supporting said film in a substantially planar configuration; and mechanical wave generating means connected to said film for generating a standing wave in said film of a predetermined characteristic shape able to concentrate incoming solar radiation at a predetermined location spaced from said film; and a solar energy collector at said predetermined location.

2. The device defined in claim 1 wherein said wave generating means includes:

a plurality of electromechanical transducers in operative contact with said film, said transducers being spaced from one another along said film; and control means operatively connected to said transducers for periodically energizing said transducers to generate said standing wave in said film.

3. The device defined in claim 1, further comprising a solar energy collector at said predetermined location.

4. The device defined in claim 1 wherein said means for supporting said film includes a pressurized chamber below said film.

5. A method for concentrating solar energy, comprising:

providing a reflective film;

supporting said film in a substantially planar configuration at a location for receiving solar radiation;

generating a standing wave in said film of a predetermined characteristic shape able to concentrate incoming solar radiation at a predetermined location spaced from said film; and concentrating incoming solar radiation at said predetermined location.

6. The method defined in claim 5 wherein the generating of said standing wave includes:

providing a plurality of electromechanical transducers in operative contact with said film, said transducers being spaced from one another along said film; and periodically energizing said transducers to generate said standing wave in said film.

7. The method defined in claim 5, further comprising pressurizing a chamber of which said film forms an upper wall.

* * * * *